United States Patent [19]
Alford

[11] Patent Number: 6,043,183
[45] Date of Patent: *Mar. 28, 2000

[54] HIGH POWER DENSITY CARBONS FOR USE IN DOUBLE LAYER ENERGY STORAGE DEVICES

[75] Inventor: John A. Alford, Goose Creek, S.C.

[73] Assignee: Westvaco Corporation, New York, N.Y.

[*] Notice: This patent is subject to a terminal disclaimer.

[21] Appl. No.: 08/880,755

[22] Filed: Jun. 23, 1997

Related U.S. Application Data

[63] Continuation-in-part of application No. 08/535,792, Sep. 28, 1995, abandoned.

[51] Int. Cl.$^7$ .............. B01J 21/18; B01J 20/02; B01J 21/04; H01G 9/00

[52] U.S. Cl. .......... 502/180; 502/416; 502/423; 502/424; 502/425; 502/426; 502/427; 502/428; 502/432; 502/433; 502/439; 361/502

[58] Field of Search ................ 502/180, 416, 502/423–428, 432, 433, 439; 361/502

[56] References Cited

U.S. PATENT DOCUMENTS

| | | | |
|---|---|---|---|
| 2,002,651 | 5/1935 | Wickenden et al. | 252/3 |
| 2,008,145 | 7/1935 | Morrell | 252/3 |
| 2,146,024 | 2/1939 | McCullough | 252/3 |
| 3,536,963 | 10/1970 | Boos | 317/230 |
| 3,634,736 | 1/1972 | Boos et al. | 317/230 |
| 3,648,126 | 3/1972 | Boos et al. | 317/230 |
| 4,107,084 | 8/1978 | Repik et al. | 252/445 |
| 4,155,878 | 5/1979 | Tolles et al. | 252/443 |
| 4,542,444 | 9/1985 | Boland | 361/433 |
| 4,677,086 | 6/1987 | McCue et al. | 502/62 |
| 4,822,765 | 4/1989 | Nishimura | 502/418 |
| 4,921,831 | 5/1990 | Nakai et al. | 502/418 |
| 4,999,330 | 3/1991 | Bose et al. | 502/402 |
| 5,039,651 | 8/1991 | Kosaka et al. | 502/424 |
| 5,102,855 | 4/1992 | Greinke et al. | 502/425 |
| 5,144,537 | 9/1992 | Tsuchiya et al. | 361/502 |
| 5,202,302 | 4/1993 | De La Pena et al. | 502/425 |
| 5,204,310 | 4/1993 | Tolles et al. | 502/416 |
| 5,206,207 | 4/1993 | Tolles et al. | 502/424 |
| 5,212,144 | 5/1993 | Schwartz, Jr. | 502/423 |
| 5,238,470 | 8/1993 | Tolles et al. | 95/143 |
| 5,250,491 | 10/1993 | Yan | 502/424 |
| 5,270,017 | 12/1993 | Schwartz, Jr. | 422/209 |
| 5,276,000 | 1/1994 | Matthews et al. | 502/424 |
| 5,304,527 | 4/1994 | Dimitri | 502/425 |
| 5,416,056 | 5/1995 | Baker | 502/425 |
| 5,444,031 | 8/1995 | Hayden | 502/180 |
| 5,504,050 | 4/1996 | Hayden | 502/180 |
| 5,538,929 | 7/1996 | Sudhakar et al. | 502/180 |

*Primary Examiner*—Elizabeth Wood
*Assistant Examiner*—Patricia L. Hailey
*Attorney, Agent, or Firm*—Daniel B. Reece, IV; Terry B. McDaniel; Richard L. Schmalz

[57] ABSTRACT

The present invention relates to carbon and methods for preparing same. In particular, this invention relates to the preparation of novel carbons derived from lignocellulosic materials (particularly wood-based lignocellulosic materials) which are useful for producing high power density double layer energy storage devices.

16 Claims, 1 Drawing Sheet

HIGH POWER DENSITY CARBONS FOR USE IN DOUBLE LAYER ENERGY STORAGE DEVICES

This application is a continuation-in-part of our commonly assigned, U.S. patent application Ser. No. 08/535,792 filed Sep. 28, 1995, entitled "High Power Density Carbons for Use in Double Layer Energy Storage Devices", now abandoned.

FIELD OF INVENTION

The present invention relates to carbon and methods for preparing same. In particular, this invention relates to the preparation of novel carbons derived from lignocellulosic materials (particularly wood-based lignocellulosic materials) which are useful for producing high power density double layer energy storage devices.

BACKGROUND OF THE INVENTION

Activated carbon is a microcrystalline, nongraphitic form of carbon which has been processed to increase internal porosity. Activated carbons are characterized by a large specific total surface area (typically in the range of 500–2500 $m^2/g$). Such large surface areas make activated carbons useful in a number of applications, including electrical energy storage devices.

The available surface area of activated carbon is dependent on its pore volume. Since the surface area per unit volume decreases as individual pore size increases, large surface area generally is maximized by maximizing the number of pores of very small dimensions and/or minimizing the number of pores of very large dimensions. Pore sizes are defined herein as micropores (pore width<2.0 nanometers or nm), mesopores (pore width=2.0 to 50.0 nm), and macropores (pore width>50.0 nm).

This invention relates to carbons derived from lignocellulosic materials (particularly wood-based lignocellulosic materials) which are suitable for use in electrical energy storage devices of the general type disclosed in U.S. Pat. Nos. 3,536,963, 3,634,736, 3,648,126, 4,542,444, and 5,144,537 (which are hereby incorporated by reference). These devices, which are commonly known as carbon double layer capacitors or CDLCs, are usually comprised of a pair of electrodes (at least one of which is a carbon paste electrode), a separator, and an ionic-insulating, electric current-conducting collector.

The carbon paste electrode in a CDLC is generally manufactured by mixing finely divided petroleum-derived carbon particles with an electrolyte to form a paste, and then subsequently forming an electrode from the paste. While the use of activated petroleum-derived carbons in CDLCs is well-known, the practical use of activated wood-based carbons in CDLCs has, until now, only been the subject of theoretical speculation.

The use of carbon double layer capacitors in various applications is well established. Such capacitors can be described in terms of their energy density (kilowatt hour/kg) and power density (watts/kg) characteristics. High energy density capacitors store a relatively high capacitance which is discharged slowly over a period of minutes. In contrast, high power density capacitors can deliver their capacitance or energy quickly (in a few milliseconds). Various practical applications have different requirements in terms of energy and power. For example, memory back-up devices require a reasonably high energy density, but do not require that the energy be released quickly (low power, long discharge time). On the other hand, an application such as starting an automobile engine requires very high power and much of the energy must be released in a few milliseconds. Other applications require combinations of energy and power densities intermediate to these two extremes.

While activated carbons having high surface areas are employed in conventional carbon double layer capacitors, it has not been recognized that certain types of activated carbons have a large and demonstrable effect upon the energy and deliverable power densities of the devices. It has now been discovered that utilizing carbons with high mesoporosity in a CDLC can significantly increase the power density.

It is, therefore, an object of this invention to provide a method for producing improved carbons derived from lignocellulosic material suitable for use in carbon double layer capacitors.

It is a further object of this invention to provide an improved carbon derived from lignocellulosic material for use in high power density CDLCs.

It is yet another object of this invention to provide an improved carbon derived from lignocellulosic material which exhibit a relatively specific pore volume and mean pore radius.

SUMMARY OF THE INVENTION

The above objects of the invention are achieved, unexpectedly, by the activation of lignocellulosic material, with a chemical activation agent in a manner to effectively minimize the macropore and micropore structure of the activated carbon while maximizing the mesopore structure of the carbon. A final densification step is undertaken wherein the activated carbon is heated under an inert atmosphere at a temperature from about 900° C. to about 1120° C.

This densification step produces carbons with improved characteristics which make these carbons more suitable for use in CDLCs than previously known lignocellulosic materials (particularly wood-based lignocellulosic materials). These improved characteristics include:

a) a decrease in the electrical resistance of the carbon, b) an increase in the capacitance of the carbon, c) an increase in the deliverable power density of the carbon, d) an increase in the density of the carbon, and e) a decrease in the amount of oxygen bound on the surface of the carbon.

DESCRIPTION OF THE PREFERRED EMBODIMENTS

Figure 1:
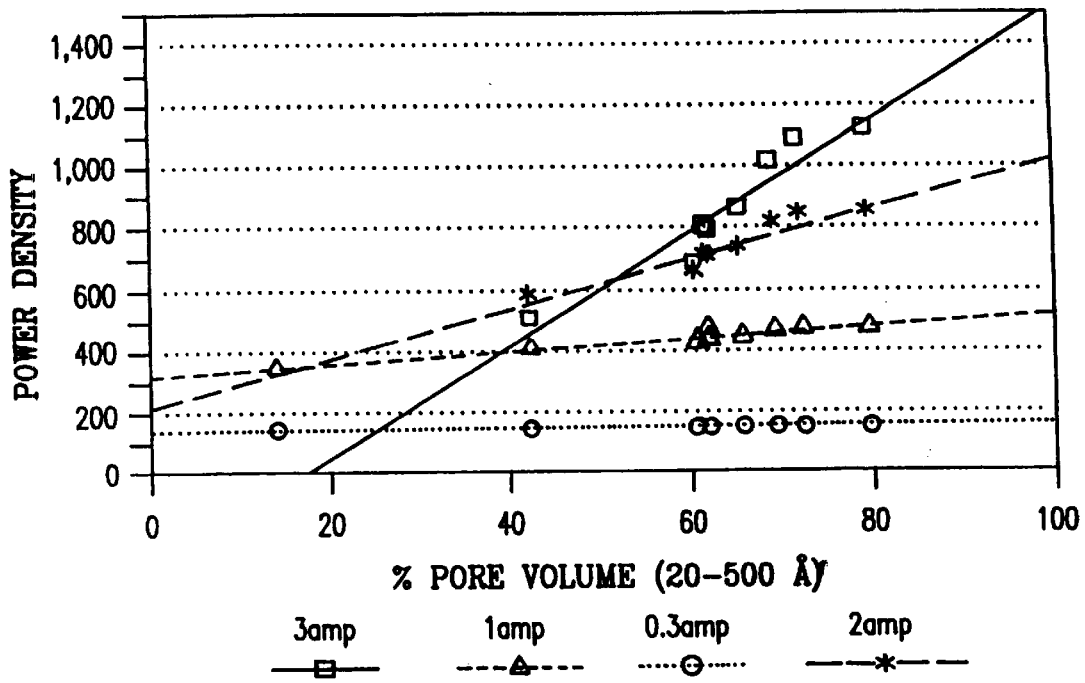
FIG. 1 is a graph showing results achieved in terms of power density vs. mesoporosity.

The improved process for producing carbons for use in high power carbon double layer capacitors comprises the steps of:

(a) blending together fragments of the lignocellulosic material with an activating agent;

(b) activating the lignocellulosic material; and (c) heating, under a gas atmosphere selected from the group consisting of inert gases, flue gases and combinations thereof, the activated lignocellulosic material to a temperature from about 900° C. to about 1120° C. in a densification step to produce an activated carbon with a pore volume of greater than about 0.45 cc/g, a median pore width of 2.0 to 50.0 nm, a specific surface area of greater than about 500 m$^2$/g, a mesopore content, based on the total pore volume, of greater than about 75%, and a total combined micropore and macropore content, based on the total pore volume, of less than about 25%.

The novel high power density activated carbons produced by the present method are characterized by having a total pore volume of greater than about 0.45 cc/g (based on pores having a diameter of less than 1000 angstroms), a median pore width of 2.0 to 50.0 nm, and a specific surface area of greater than about 500 m$^2$/g. Preferably, the carbons exhibit a pore volume of greater than 0.50 cc/g and a specific surface area of about 1,000 to about 2,500 m$^2$/g.

The novel high power density carbons also exhibit (based on the total pore volume) a mesopore content of greater than about 75%, preferably greater than about 90%, and more preferably greater than about 99%. Correspondingly, such activated carbons would also exhibit a total combined micropore and macropore content of less than 25%, preferably less than 10%, and more preferably less than 1% (based on the total pore volume).

In order to increase the surface areas of natural occurring carbonaceous material these carbons are subjected to an activation process. Such activation of the raw material is commonly accomplished via either chemical or thermal activation processes. Examples of such activation processes are taught in commonly assigned U.S. Pat. Nos. 4,107,084, 4,155,878, 5,212,144, and 5,270,017; which are hereby incorporated by reference.

The effective porosity of activated carbon produced by thermal activation is the result of gasification of the carbon at relatively high temperatures (after an initial carbonization of the raw material), while the porosity of chemically activated products generally is formed by chemical dehydration/condensation reactions occurring at significantly lower temperatures. Chemical activation typically is carried out commercially in a single kiln. The raw material precursor is impregnated with a chemical activation agent, and the blend is heated to a temperature of 450°–700° C. Chemical activation agents reduce the formation of tar and other by-products, thereby increasing yield.

Suitable raw lignocellulosic material precursors for use during chemical activation in the invention include, but are not limited to, the following: hardwood, softwood, lignin, nut shells, nut pits, and the like, and various combinations thereof. Wood-based materials are preferred precursors; with the more preferred precursors being wood-based materials such as wood chips, wood flour, wood dust, sawdust, and combinations thereof.

Suitable chemical activation agents include alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfric acid; oleum; and combinations thereof. Preferred among these agents are phosphoric acid and zinc chloride. Most preferred is phosphoric acid.

It is known in the art how to manipulate the activation processes to obtain carbons having a general preponderance of a desired pore volume (see, generally: U.S. Pat. Nos. 4,677,086, 5,204,310, 5,206,207, 5,250,491, 5,276,000, and 5,304,527; which are hereby incorporated by reference). However, the carbons produced via the methods taught in these references (particularly the wood-based carbons) have proven to be unsuitable for use in CDLCs. Indeed, it has now been discovered that such carbons must undergo the additional densification step taught herein in order to acquire the characteristics necessary for successful incorporation into CDLCs.

The present method for producing the novel carbons can be described generally by the following sequence of steps:

A. Activating agent/lignocellulose material blending,

B. Activation, and

C. Heat treatment (densification).

The amounts of activating agent and lignocellulose material to be blended together in Step A will, of course, depend upon the actual types of agents and materials utilized. The blending of Step A is generally conducted at from about 35° to about 95° C. for a period of up to one hour. Suitable activating agent to lignocellulose material wood ratios are in the range of 3:1 to 1.2:1, respectively. The preferred activating agent to lignocellulose material wood ratios are in the range of about 2:1 to about 1.6:1, respectively.

The activation of Step B is generally conducted to a temperature of about 550° C.

As noted above, during the heat treatment (or densification) of Step C the activated carbon is heated under an inert atmosphere (or "flue gas") at a temperature from about 900° C. to about 1120° C.; with the preferred temperature range being from 990° C. to about 1120° C., and the most preferred temperature range being from about 1065° C. to about 1120° C. This densification step is generally conducted for a period greater than about 20 minutes (preferably between about 20 to about 60 minutes).

While the novel carbons disclosed herein are useful in producing the carbon paste utilized in CDLCs of the type generally disclosed in the above-noted U.S. patents, the carbons may also be useful in other types of electrical devices which employ carbons as electrodes (such as batteries, fuel cells, etc.). A typical CDLC is comprised of: (1) a pair of electrodes where at least one of the electrodes (and preferably both electrodes) is a carbon paste electrode, (2) a porous ionically conductive separator, and (3) an ion-insulating collector to electrically contact the electrodes. A single cell or a plurality of cells can comprise an energy storage device.

Electrolytes suitable for use in producing high power density CDLCs containing the novel carbons consist of any highly ionically conductive medium such as an aqueous solution of an acid, salt, or a base. If desired, non-aqueous electrolytes (wherein water is not utilized as a solvent) can also be used.

The electrolyte in the electrode structure serves three general functions: (1) as a promoter of ion conductivity, (2) as a source of ions, and (3) as a binder for the carbon particles. Sufficient electrolyte should be used to accommodate these functions (although a separate binder can be used to perform the binding functions).

While higher power densities are obtained when the novel carbon is employed in both cell electrodes, enhanced power density can be achieved even where one electrode is composed of other materials known in the art. The preparation and use of such non-carbon electrodes are described in U.S. Pat. Nos. 3,634,736 and 3,648,126.

The ion-insulating, electric current collector can be any conducting material which is impervious to ionic conductivity. Suitable materials for use in producing these connectors include: carbon, copper, lead, aluminum, gold, silver, iron, nickel, tantalum, conducting polymers, non-conductive polymers filled with conducting material so as to make the polymer electrically conductive, and the like. Preferred are carbon or graphite loaded butyl rubbers or carbon filled polycarbonates. The connector should be electrically collector to an electrode.

Between the electrodes is a separator generally made of a highly porous material which functions as an electronic insulator between the electrodes while affording free and unobstructed movement to the ions in the electrolyte. The pores of the separator must be small enough to prevent electrode-to-electrode contact between the opposing electrodes (as such a condition would result in a short circuit and consequent rapid depletion of the charges accumulated on the electrode). Generally, any conventional battery separator is suitable for use in high power density CDLCs. The separator can also be an ion-permeable membrane which allows ions to pass there through, but prevents electrons from passing there through.

The invention method for producing the improved carbons for use in high power density CDLCs is disclosed in the following examples. These examples are provided to further illustrate the present invention and are not to be construed as limiting the invention in any manner.

EXAMPLE 1

Multiple batches of the novel activated carbons were prepared by repeatedly mixing 2,070 g of concentrated phosphoric acid solution (85–86% concentration) with 1,950 g of sawdust (43% moisture) for an acid:sawdust ratio of 1.6:1 (by dry weight of their respective solids) and stirring for 30 minutes at 80–95° C., after which the mixture (a mass of discreet sawdust particles) was transferred to shallow glass trays and spread into a 1–1.5 cm thick layers for continued heating in an oven. Heat treatment was continued at 70° C. for about 36 hours, at which time the material began transition from plastic to thermoset (i.e., product appears dry and not sticky).

Activation of the thermoset char was performed in a bench-scale, direct-fired rotary kiln by gradually raising the temperature to about 480° C. Subsequently, the activated carbon was allowed to cool, washed with water, and dried.

The activated carbons were subjected to final densification step at different temperatures. A rotary kiln was heated to a temperature between either: 1) about 945° C. to about 985° C. (these samples are hereafter designated by the letter "A"), or 2) between about 1065° C. to about 1120° C. (samples "B"). Activated carbon was added to the kiln under an "inert" atmosphere maintained by a flow of nitrogen gas (0.5 cu ft/min) through the kiln. The off gases from the carbon were ignited and generally burned. After about 40 minutes the carbon was dumped under nitrogen into a purge pot and maintained under nitrogen until the carbon cooled to near ambient temperature.

These carbons were used to produce a series of carbon paste electrodes (as described below). The electrodes were utilized to assemble a series of CDLCs for evaluation, the results of which are noted in Table I below.

An electrolyte mixture of $H_2SO_4$ (38% by weight) and water was slowly added to about 100 grams of carbon until the carbon was contained in a large excess of electrolyte. The carbon was allowed to soak in the electrolyte for approximately 48 hours under ambient pressure. The carbon was then vacuum filtered through a Buchner funnel to remove some of the excess electrolyte so that the carbon/electrolyte mixture became a paste. The carbon paste was then placed in a compression fixture with the fixture placed in a hydraulic press and compressed at about 3400 psi to remove excess electrolyte. A carbon aggregate was obtained which was removed from the compression fixture and granulated through a 400 (0.37 mm) mesh sieve.

A gasket, stamped out of a sheet of non-conductive butyl rubber, was submitted to a flat circular sheet of a conductive butyl rubber using an industrial adhesive. The nonconductive and conductive butyl rubbers are commercially available. The nonconductive butyl rubber gasket had internal diameter of 0.75 inches and an external diameter of 1.0 inch. The circular sheet of conductive butyl rubber had a thickness of about 0.004 inches (0.1 cm) and a diameter of about 1.0 inch.

Approximately 0.25 grams of the carbon paste granulate was placed into the cavity created by the gasket and the circular sheet of butyl rubber and compressed under a pressure of about 400 psi. A pair of such electrode assemblies were prepared and a polypropylene separator having a thickness of 0.001 inches and a diameter of about 1.0 inch was interposed between the electrode assemblies. The electrode assemblies, each having a carbon paste electrode, were adhered together with an adhesive to form a CDLC having two carbon paste electrodes. Three of these one-volt CDLC cells were connected in series and evaluated. The results are recorded in Table I below.

TABLE I

| Sample No.[1] | Current (amps)[2] | Resistance (ohms)[3] | Capacitance (farads) | Power Density (w/Kg) | Energy Density (whr/Kg) |
|---|---|---|---|---|---|
| Control | 0.03 | 1.102 | 2.070 | 15.89 | 0.904 |
|  | 1.00 | 1.102 | 0.086 | 338.98 | 0.015 |
|  | 3.00 | 1.102 | 0.000 | 0.00 | 0.000 |
| 1A | 0.03 | 0.204 | 2.64 | 16.30 | 1.170 |
|  | 1.00 | 0.204 | 2.22 | 499.00 | 0.860 |
|  | 3.00 | 0.204 | 2.14 | 1279.00 | 0.610 |
| 2A | 0.03 | 0.265 | 3.26 | 16.02 | 1.450 |
|  | 1.00 | 0.265 | 2.83 | 488.40 | 1.050 |
|  | 3.00 | 0.265 | 2.76 | 1181.30 | 0.665 |
| 2B | 0.03 | 0.206 | 2.05 | 16.04 | 0.911 |
|  | 1.00 | 0.206 | 1.67 | 498.90 | 0.646 |
|  | 3.00 | 0.206 | 1.44 | 1276.00 | 0.400 |
| 3A | 0.03 | 0.301 | 2.85 | 16.02 | 1.260 |
|  | 1.00 | 0.301 | 2.41 | 482.00 | 0.870 |
|  | 3.00 | 0.301 | 2.43 | 1123.00 | 0.532 |
| 3B | 0.03 | 0.262 | 2.08 | 16.03 | 0.875 |
|  | 1.00 | 0.262 | 1.42 | 494.30 | 0.585 |
|  | 3.00 | 0.262 | 1.07 | 1234.00 | 0.305 |
| 4A | 0.03 | 0.350 | 3.62 | 16.01 | 1.600 |
|  | 1.00 | 0.350 | 3.02 | 473.00 | 1.050 |
|  | 3.00 | 0.350 | 3.00 | 1044.60 | 0.565 |
| 4B | 0.03 | 0.242 | 2.79 | 16.03 | 1.240 |
|  | 1.00 | 0.242 | 2.16 | 492.50 | 0.815 |
|  | 3.00 | 0.242 | 1.62 | 1218.00 | 0.416 |
| 5A | 0.03 | 0.325 | 4.26 | 19.04 | 1.890 |
|  | 1.00 | 0.325 | 3.39 | 477.70 | 1.200 |
|  | 3.00 | 0.325 | 3.21 | 1084.80 | 0.650 |
| 5B | 0.03 | 0.266 | 2.57 | 16.02 | 1.140 |
|  | 1.00 | 0.266 | 1.94 | 488.21 | 0.720 |
|  | 3.00 | 0.266 | 1.31 | 1382.90 | 0.310 |
| 6A | 0.03 | 0.333 | 2.71 | 16.01 | 1.200 |
|  | 1.00 | 0.333 | 2.65 | 476.30 | 0.934 |
|  | 3.00 | 0.333 | 2.71 | 1072.00 | 0.538 |
| 6B | 0.03 | 0.201 | 2.09 | 16.03 | 0.929 |
|  | 1.00 | 0.201 | 1.64 | 500.00 | 0.637 |
|  | 3.00 | 0.201 | 1.09 | 1284.00 | 0.311 |

[1] The control sample was not subjected to a final densification step. The A samples were subjected to a final densification step at a temperature between about 945° C. to about 985° C., while the B samples were densified at a temperature between about 1065° C. to about 1120° C.
[2] Current density can be calculated by dividing the current (amps) by the surface area of the electrode cell (about 2.85 $cm^2$).
[3] Resistance was measured by impedance at 1000 hz.

The results can be interpreted in view of the following two equations:

$$E = 1/2 C(V-iR)^2; \quad \text{A.}$$

and $$P = 1/2 i(V-iR); \quad \text{B.}$$

where: E=energy, P=power, C=capacitance, V=voltage, i=current, and R=resistance.

A lowered resistance resulted in a higher power density than that obtained by the control sample. Likewise, an increased capacitance yielded an increased energy density. Therefore, as the data in Table I clearly indicates, the CDLCs made with the novel activated carbons achieved much higher power densities than did the control CDLCs made with standard (control) carbon.

EXAMPLE 2

A series of novel carbons were prepared by the procedure outlined in Example 1 above. Subsequently, the carbon was ground into minute particles having an average size of about 20 to 40 microns.

The different carbons were analyzed for total pore volume, pore volume distribution, and surface area. Using nitrogen as the adsorptive, evaluations of the surface areas of the carbons were made by employing the standard Brunauer-Emmet-Teller (BET) model of physical adsorption.

Porosity in pores larger than 50 nm (macroporosity) was determined using a MICROMERITICS® PORESIZER 9310 which measures the volume of mercury forced into pores under the influence of pressure. The distribution of pore volume with pore size is calculated using the standard model Washburn equation.

Porosity in pores smaller than 50 nm was determined using a MICROMERITICS® DIGISORB 2600. Adsorption isotherm data for nitrogen, measured at a temperature of about 77° K is used with the Kelvin and Halsey equations to determine the distribution of pore volume with pore size of cylindrical pores according to the standard model of Barrett, Joyner, and Halenda. For the purposes of the examples and the invention claimed herein, macroporosity consists of pore diameters greater than 50.0 nm, mesoporosity consists of pore diameters from 2.0 to 50.0 nm, and microporosity consists of pore diameters of less than 2.0 nm.

The results of the evaluations are shown in Table II below.

TABLE II

Surface Area and Pore Volume of Carbon Samples

| Sample | BET Area ($m^2$/g) | Percent <2.0 nm | Percent 2.0 to 50.0 nm | Cumulative Pore Volume (cc/g) |
| --- | --- | --- | --- | --- |
| 1 | 2247 | 17.53 | 72.44 | 1.702 |
| 2 | 1648 | 8.80 | 80.06 | 1.420 |
| 3 | 1663 | 31.14 | 62.04 | 1.070 |
| 4 | 2452 | 32.29 | 60.89 | 1.448 |
| 5 | 2580 | 30.53 | 66.02 | 1.537 |
| 6 | 2172 | 85.00 | 14.29 | 1.021 |
| 7 | 2049 | 20.65 | 69.67 | 1.507 |
| 8 | 2963 | 35.54 | 62.35 | 1.589 |
| 9 | 2723 | 55.00 | 42.64 | 1.358 |

These carbons were subsequently used to produce a series of carbon paste electrodes following the procedures outlined in Example 1 above. The electrodes were utilized in the production of a series of CDLCs for evaluation, the results of which are noted in Table III below.

TABLE III

Power Density (W/Kg) as a Function of Current[1]

| Sample | 0.03 A | 0.10 A | 0.30 A | 1.0 A | 2.0 A | 3.0 A | 4.0 A |
| --- | --- | --- | --- | --- | --- | --- | --- |
| 1 | 16.1 | 52.9 | 155.4 | 478.6 | 842.9 | 1092.9 | 1228.6 |
| 2 | 16.1 | 52.9 | 155.7 | 482.1 | 857.1 | 1130.4 | 1292.9 |
| 3 | 16.1 | 52.9 | 152.9 | 446.4 | 714.3 | 803.6 | 0 |
| 4 | 16.1 | 52.9 | 151.4 | 433.9 | 660.7 | 685.7 | 0 |
| 5 | 16.1 | 51.9 | 153.2 | 453.6 | 739.3 | 862.5 | 0 |
| 6 | 16.1 | 52.9 | 144.3 | 351.9 | 0 | 0 | 0 |
| 7 | 16.1 | 52.9 | 155.0 | 471.4 | 810.7 | 1017.9 | 1100.0 |
| 8 | 16.1 | 52.9 | 152.9 | 444.6 | 707.1 | 787.5 | 0 |
| 9 | 16.1 | 52.9 | 150.0 | 414.3 | 585.7 | 514.3 | 0 |

[1] If desired, the current density can be calculated by dividing the current (amps) by the surface area of the electrode cell (about 2.85 $cm^2$).

The results can be interpreted in view of the following two equations:

$$E = 1/2 C(V-iR)^2 /Kg; \quad \text{A.}$$

and $$P = 1/2 i(V-iR)/Kg; \quad \text{B.}$$

where: E=energy, P=power, C=capacitance, V=voltage, i=current, and R=resistance.

Figure 2:
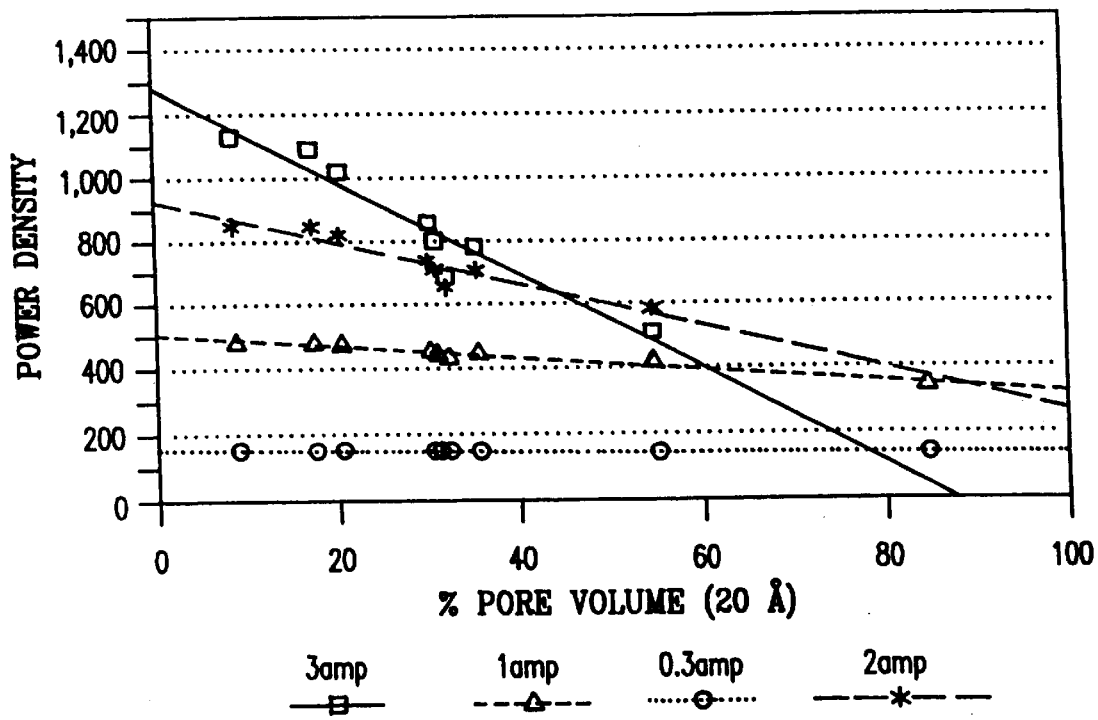
FIG. 2 is a graph showing results achieved in terms of power density vs. microporosity.

An analysis of the porosity data in Table II and the energy density data at a specific current in Table III clearly indicates that the power density of the capacitor increases with increasing percent mesoporosity and decreases with increasing microporosity and/or macroporosity. The relationship is more clearly seen in graphical form in FIGS. 1 and 2 below.

Many modifications and variations of the present invention will be apparent to one of ordinary skill in the art in light of the above teaching. It is understood therefore that the scope of the invention is not to be limited by the foregoing description but rather is to be defined by the claims appended hereto.

What is claimed is:

1. An improved process for producing carbons for use in high power carbon double layer capacitors comprising the steps of:
   (a) blending together fragments of a lignocellulosic material with an activating agent;
   (b) activating the lignocellulosic material; and
   (c) wherein the improvement comprises heating, under a gas atmosphere selected from the group consisting of inert gases, flue gases and combinations thereof, the activated lignocellulosic material to a temperature from about 900° C. to about 1120° C. in a densification step to produce an activated carbon with a pore volume of greater than about 0.45 cc/g, a median pore width of 2.0 to 50.0 nm, a specific surface area of greater than about 500 $m^2$/g, a mesopore content, based on the total pore volume, of greater than about 75%, and a total combined micropore and macropore content, based on the total pore volume, of less than about 25%.

2. The process of claim 1 wherein the lignocellulosic material is member selected from the group consisting of hardwood, softwood, lignin, nut shells, nut pits, and combinations thereof.

3. The process of claim 1 wherein the lignocellulosic material is derived from wood.

4. The process of claim 1 wherein the lignocellulosic material is selected from the group consisting of wood chips, wood flour, wood dust, sawdust, and combinations thereof.

5. The process of claim 1 wherein the activation agent is selected from the group consisting of alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; oleum; and combinations thereof.

6. The process of claim 1 wherein the ratio by weight of activating agent to lignocellulosic material is from 3:1 to 1.2:1, respectively.

7. The process of claim 1 wherein the ratio by weight of activating agent to lignocellulosic material is from about 2:1 to about 1.6:1, respectively.

8. The process of claim 1 wherein the activation of the lignocellulosic material is conducted at a temperature of about 550° C.

9. The process of claim 1 wherein the activated lignocellulosic material is heated to a temperature from about 990° C. to about 1120° C. in the densification step (c).

10. The process of claim 1 wherein the activated lignocellulosic material is heated to a temperature from about 1065° C. to about 1120° C. in the densification step (c).

11. The process of claim 1 wherein the densification step (c) is conducted for a period of about 20 to about 60 minutes.

12. The process of claim 1 wherein the activated carbon exhibits a total pore volume of greater than about 0.50 cc/g.

13. The process of claim 1 wherein the activated carbon exhibits a specific surface area of about 1,000 $m^2/g$ to about 2,500 $m^2/g$.

14. The process of claim 1 wherein the activated carbon exhibits, based on the total pore volume, a mesopore content of greater than about 90%, and a combined micropore and macropore content, based on the total pore volume, of less than about 10%.

15. The process of claim 1 wherein the activated carbon exhibits, based on the total pore volume, a mesopore content of greater than about 99%, and a combined micropore and macropore content, based on the total pore volume, of less than about 1%.

16. The activated carbon produced by the process of claim 1.

* * * * *

UNITED STATES PATENT AND TRADEMARK OFFICE
CERTIFICATE OF CORRECTION

PATENT NO.  : 6,043,183
DATED       : March 28, 2000
INVENTOR(S) : John A. Alford It is certified that error appears in the above-identified patent and that said Letters Patent is hereby corrected as shown below:

In column 4, line 17, delete "wood" and substitute therefor --weight--.

In column 4, line 19, delete "wood" and substitute therefor --weight--.

In column 4, lines 64-65, delete "connectors" and substitute therefor --collectors--.

In column 5, line 3, delete "connector" and substitute therefor --collector--

In column 5, lines 3-4, delete "collector" and substitute therefor --connected--.

Signed and Sealed this

Thirteenth Day of February, 2001

Attest:

NICHOLAS P. GODICI

*Attesting Officer*    *Acting Director of the United States Patent and Trademark Office*